US012488295B2

United States Patent
Wagenaar

(10) Patent No.: US 12,488,295 B2
(45) Date of Patent: Dec. 2, 2025

(54) SYSTEM OPERABLE TO ENABLE THE ENDORSEMENT OF INDIVIDUALS AND/OR THEIR SKILLS OR SERVICES, AND A METHOD OF ENDORSING ONE INDIVIDUAL AND/OR THEIR SKILLS OR SERVICES

(71) Applicant: Rudolph Wagenaar, Cape Town (ZA)

(72) Inventor: Rudolph Wagenaar, Cape Town (ZA)

(*) Notice: Subject to any disclaimer, the term of this patent is extended or adjusted under 35 U.S.C. 154(b) by 191 days.

(21) Appl. No.: 17/757,774

(22) PCT Filed: Jan. 15, 2021

(86) PCT No.: PCT/ZA2021/050001
§ 371 (c)(1),
(2) Date: Jun. 20, 2022

(87) PCT Pub. No.: WO2021/151125
PCT Pub. Date: Jul. 29, 2021

(65) Prior Publication Data
US 2023/0342679 A1    Oct. 26, 2023

(30) Foreign Application Priority Data
Jan. 23, 2020 (ZA) .................................. 2020/00449

(51) Int. Cl.
*G06Q 10/0631* (2023.01)
*G06Q 20/40* (2012.01)
*G06Q 50/00* (2024.01)

(52) U.S. Cl.
CPC . *G06Q 10/063112* (2013.01); *G06Q 20/4014* (2013.01); *G06Q 50/01* (2013.01)

(58) Field of Classification Search
None
See application file for complete search history.

(56) References Cited

U.S. PATENT DOCUMENTS

| 2013/0097093 A1* | 4/2013 | Kolber | G06Q 10/1053 705/321 |
| 2013/0124268 A1 | 5/2013 | Hatton | |

(Continued)

OTHER PUBLICATIONS

Perez-Roses, "Endorsement deduction and ranking in social networks," 2016, Computer Communications, vol. 73, pp. 200-210 (Year: 2016).*

(Continued)

*Primary Examiner* — Ivan R Goldberg
(74) *Attorney, Agent, or Firm* — Conley Rose, P.C.

(57) ABSTRACT

A system operable to enable the endorsement of individuals and/or their skills by third parties, including one or more of the following: a means for a first user of said system to create a user profile on said system; a means of making a video recording or photographic image, said video recording or photographic image being that of said first user being together with a second user either in person recording the joint video endorsement side by side or virtually when it is not possible for both parties to be in the same physical location; a means of enabling said first and/or said second user to associate said videorecording or photographic image to a user profile of said first and/or said second user on said system, in use; and database/s operable to store one or more user profiles including video recordings and/or photographic images associated with a user.

13 Claims, 5 Drawing Sheets

(56) References Cited

U.S. PATENT DOCUMENTS

| | | | |
|---|---|---|---|
| 2014/0358606 A1* | 12/2014 | Hull | G06Q 10/063112 |
| | | | 705/7.14 |
| 2015/0356512 A1* | 12/2015 | Bradley | G06F 16/735 |
| | | | 705/321 |
| 2016/0192119 A1 | 6/2016 | Rochberger et al. | |
| 2016/0196534 A1* | 7/2016 | Jarrett | G06Q 50/2057 |
| | | | 705/321 |
| 2016/0239806 A1* | 8/2016 | Benham | G06Q 10/1053 |
| 2017/0011039 A1 | 1/2017 | Spaulding et al. | |
| 2018/0082256 A1* | 3/2018 | Tummuru | H04L 9/3297 |
| 2018/0115797 A1* | 4/2018 | Wexler | H04L 67/535 |
| 2018/0332135 A1 | 11/2018 | Jayram | |
| 2019/0087781 A1* | 3/2019 | Mercury | G06Q 10/06393 |
| 2019/0122161 A1* | 4/2019 | Cicio, Jr. | G06Q 10/063112 |
| 2019/0124373 A1 | 4/2019 | Newell et al. | |
| 2019/0139000 A1* | 5/2019 | Sharpe | G06Q 10/1091 |
| 2020/0110786 A1* | 4/2020 | Kim | G06Q 10/1053 |

OTHER PUBLICATIONS

ISR for PCT/ZA2021/050001 (May 6, 2021).

\* cited by examiner

SYSTEM OPERABLE TO ENABLE THE ENDORSEMENT OF INDIVIDUALS AND/OR THEIR SKILLS OR SERVICES, AND A METHOD OF ENDORSING ONE INDIVIDUAL AND/OR THEIR SKILLS OR SERVICES

FIELD OF THE INVENTION

The present invention relates to a system operable to enable the endorsement of individuals and/or their skills, and a method of endorsing individuals and/or their skills.

BACKGROUND TO THE INVENTION

It is well known that a review provided by a client, customer or purchaser ("the end-user") is effectively independent feedback and/or a critical evaluation of the quality and/or standard of a particular product or service. It is generally made by an independent third party that has had first-hand experience of the particular product or service. End-user reviews such as these are often used as a mechanism for a business to solicit and showcase positive feedback on its e-commerce website, online shopping website or mobile application. In this manner, the business is able to highlight the confidence that users have had in its products or services in the past. This provides a means of invoking trust and goodwill from other, would-be customers.

As is generally known by the wider public, dedicated customer review websites and mobile applications are also available. Some of these dedicated review sites are often limited to a specific type of product or service, such as accommodation facilities or restaurants, for example. These dedicated websites often use customer reviews as well as or instead of professional reviews to benchmark and compare businesses. The reviews may themselves may be graded for usefulness or accuracy by other users.

Sometimes a client, customer or purchaser reviews the actual person helping the client or selling the product, thereby enabling more goodwill to attract to that particular individual and any business/es associated with that individual. Consequently, such a review makes the relevant person stand out from their peers as, for example, as being a "good employee", one having expert knowledge in their field or as someone that has a good attitude, a helpful nature, for example.

People sometimes have to participate in job interviews in a competitive job market—where their skills, experience and demeanour on the day of the interview are effectively used to determine their suitability to a particular role. Unfortunately, some good job applicants are often bypassed or overlooked before or during such a conventional interviewing process in so far as the applicants' personality and defining characteristics such as their dedication to the job, work-ethic etc are. simply not picked up on by the interviewer.

Across the globe, there are many ordinary or "working class" people that possess exceptional talent and skill within the context of a particular industry, including such traits as having a genuine interest in those around them and softer skills related to emotional intelligence ("EQ"). It will be appreciated by those in the industry, that these traits cannot be readily identified during a conventional interviewing process. However, these traits nonetheless form the backbone of any business within the services industry or any business that has a client or customer facing component. These softer skills are often more important than conventional skills (e.g. training, workplace experience, etc.) in terms of identifying the suitability of an applicant to a particular vocation.

Examples of ordinary people with exceptional talents and skills within a particular industry abound. Also, the more informal job market such as those related to the painters, domestic helpers, nannies, baby sitters, tilers, plasterers, wallpaper installers, informal car mechanics, informal builders, artists, panel beaters, garden workers, handymen, dog walkers, house sitters, yoga enthusiasts, individuals who can cook and present cooking classes, people who assist an elderly or senior citizen who needs nursing assistance for dressing, washing, mobilizing, just to name a few also have a wealth of people with exceptional skills and talent including the aforementioned crucial softer skills. It is important to note the above list is not exhaustive, and merely provides an overview of some of the more informal trades where attitude and softer skills form an integral part of a successful would-be employee. These individuals may, for example, not necessarily have the requisite formal training but already possess a network of people (employers) who make use of use of their skills and talents on an ad hoc basis.

In underprivileged communities in developing countries such as South Africa, informal employment of the above type is often the only form of employment available to a large proportion of the working population. Here too, people with exceptional talents and skills are continuously having to "interview" with new "employers" to obtain ad hoc employment, paying work assignments and the like. A typical example within the South African context would for example be informal tradesmen standing outside of hardware stores and the like, with placards displaying their specific trades, e.g. a tile cutter or a painter holding a paintbrush and/or a placard showing their would-be "employers" that they are capable of building. These people are all continuously trying to attract potential employers to make use of their talent, service or skill for on an ad hoc basis (i.e. for part-time informal work). Due to the high number of these individuals situated at any given location or advertising their skills and experience on a specific platform, it makes it difficult for a potential part-time employer to cross-reference the testimonials (i.e. reference letters) provided by these individuals to establish the credibility of the individual, including that the individual in question in fact possesses the correct skill or talent and is competent in delivering on "employer" expectations including meeting predetermined standards or quality levels.

Apart from the aforementioned informal labourers, many formally qualified individuals (e.g. Intensive-Care Unit (ICU) nurses, qualified mechanics, registered tour guides, drivers, registered plumbers, electricians, NHBC registered builders, qualified, trained opera teachers, etc and this is not intended to be an exhaustive list; who are looking at building a paper trail of testimonials or reference letters for future employment prospects, are also faced with the same problem to having an easily verifiable way of showcasing their skills and competencies to would-be "employers".

It is well known in the industry, that a recommendation letter, also known as a reference letter, is a document in which the writer assesses the qualities, characteristics, and capabilities of the person being recommended in terms of that individual's ability to perform a task or function. Recommendation letters are more often than not related to employment, admission to institutions of higher education, scholarship applications and the like. Recommendation letters are usually specifically requested from a referrer, to be written on behalf of someone else. The referrer should know the person they have been requested to write about well enough to be able to attest to that person's character, skills and experience. Usually, the referrer has firsthand experience of the individual in question's character and softer skills.

A strong reference letter usually acts as an endorsement of the candidate. Letters provided by people who have personally worked with an individual usually provides the best insight.

These letters act to advocate an individual and provide an affirmation, backing or approval that the individual has certain "traits of the industry". A reference letter often helps persuade a potential employer that the individual left under good terms and that the person was an important contributor at the previous company. To make the letter more convincing, it usually includes the title and a brief background about the writer. This information helps further explain that the reference giver was able to determine how well the person fit in with the company.

A reference letter or review of an individual has the power to influence future employers or people to use the person for a service or for employment. Reviews can gain a third party's trust in an individual and encourages people to interact with the person for business and/or future employment.

Even though reviews and references hold a lot of power in supporting the individual being referenced or reviewed, the reliability of such references and reviews has many a time been questioned. It is often hard to tell whether such reviews were written by people who are biased towards the individual being reviewed and as of such are skewed in their accuracy. It is also difficult to tell whether the review or reference letter was in fact written by the so-called author and if so whether the author still feels this way (especially if the reference was written a long time ago). It is also difficult to verify if a customer has in fact used the person they are reviewing.

It will be appreciated that if accurate, reliable and up-to-date references and/or reviews cannot be collected, stored, accessed or shared, an individual may lose their ability to potentially get a job, get accepted into an institution and/or can cause false references to fall through the cracks.

OBJECT OF THE INVENTION

It is an object of the invention to provide a system operable to enable the endorsement of individuals and/or their skills or services, and a method of endorsing individuals and/or their skills or services which provides for the advantages and addresses at least some of the issues and/or deficiencies described above.

SUMMARY OF THE INVENTION

According to a first aspect of the invention, there is provided a system operable to enable the endorsement of individuals and/or their skills by third parties, the system is provided in the example form of a mobile application and/or platform operable to be run on a mobile device and/or computer, including one or more of the following:
  a means for a first user of said system to create a user profile on said system;
  a means of making a video recording or photographic image, said video recording or photographic image being that of said first user being together with a second user either in person recording the joint video endorsement side by side or virtually when it is not possible for both parties to be in the same physical location;
  a means of enabling said first and/or said second user to associate said video recording or photographic image to a user profile of said first and/or said second user on said system, in use; and
  one or more databases operable to store one or more user profiles including one or more video recordings and/or photographic images associated with said one or more users.

In an embodiment of the invention, said mobile device application and/or mobile platform includes one or more data encryption and security protocols.

In an embodiment of the invention, said mobile device application and/or mobile platform includes a secure payment gateway. In this embodiment, said secure payment gateway facilitates one or more of the following prepaid, debit or credit card payment mechanisms: VISA™, Mastercard™, American Express M, Discovery Network™, Diners Club™, JCB™ and/or PayPal™ and/or in the form of a crypto currency. In this embodiment, said secure payment gateway may be securely accessed by one or more authorised users, in use.

In an embodiment of the invention, said means of making a joint video recording and/or taking a photographic image (photograph) is provided in the example form of one or more mobile applications and/or platforms on said mobile device. In this embodiment, said mobile device is operable to record joint videos and upload said recorded videos to said first and/or second users' profile and/or said mobile device is operable to take photographs and upload said photographs to said first and/or second users' profile. In an example embodiment, said joint video recording includes said first user and second user present including one or more people, said people recording a "video-selfie" when together in person or virtually side by side in terms of which the people cross-recommend and/or endorse each other and/or third parties. In this embodiment, said recommendation or endorsement between persons will be in the example form of a handshake video and/or a virtual handshake video taking place between said first and/said second user. In this embodiment, the video recording will include the storage of videographic content including sound related to said combined handshake.

In an embodiment of the invention, said system includes one or more databases, said databases being operable to securely store and protect a user's personal information, uploaded photographs, and uploaded video/s, in use. In this embodiment, said two or more users' personal information includes, but is not limited to: an identification number of a user, an e-mail address of a user, a mobile number of a user and/or one or more social media handles of a user, one or more skill/s or competencies of a user, an uploaded video of user/s, an uploaded photograph of user/s.

In an embodiment of the invention, said uploaded joint video/s and/or uploaded photographs may be visible on said user's profile as and when the user prefers to display said joint video/s and/or said photographs. In this embodiment, the user may remove and/or hide the joint video/s and/or photographs uploaded to said user's profile, from public view whenever the user wishes. In this embodiment, said user's profile lists the user under one or more competencies and/or skills.

In an embodiment of the invention, said system further includes a blockchain verification structure. In this embodiment, said blockchain verification structure assists said system in tracking one or more user/s based upon said user/s' skills; said user/s' ability to deliver a service and/or said user/s' ability to perform a specific job successfully whilst simultaneously building trust, to name a few.

In an embodiment of the invention, said system uses side by side video (either in person or virtually) to create a simple competency-based blockchain for people, building trust and ultimately create opportunity, in use.

According to a second aspect of the invention, there is provided a method of endorsing individuals and/or their skills said method including one or more of the following steps:

registering a user on a mobile application and/or platform in accordance with the one or more skills and/or services associated with said user;

creating one or more "video-selfie/s" endorsement or review video/s of one or more users using a video recording device when in person in the same physical location or virtually when not possible to be in the same physical location; and uploading said combined side by side video recording/s onto one or more user's profiles.

In an embodiment of the invention, said method includes a digital identification link recorded against said joint endorsement video of a user not registered on said system. In this embodiment, said digital identification link may be used for tracking and/or accessing said joint video at a later stage. In the event that any of the users are not registered on the said system, a digital identification link is recorded against the joint endorsement or review video/s to allow tracking and/or access at a later stage.

In an embodiment of the invention, said method further includes the step of receiving Global Positioning System (GPS) information including the geographical position of an associated user's profile with a listed skill and/or talent and linking it to another user's search for said listed skill/talent in same area.

In an embodiment of the invention, said method further includes the step of making payment through a secure payment gateway, in accordance with the selected user's profile.

In an embodiment of the invention, said method further includes the step of displaying personal information of said searched user when selecting and making payment for such information on the mobile application and/or platform.

In an embodiment of the invention, said method further includes the step of selecting a user whose skill/service another user is searching for in a specified geographical area.

In an embodiment of the invention, said method further includes the step of a user being able to select which joint video/s a user will want to be displayed to the public and which video/s the user wants to take off from being available, whenever they wish to do so.

In an embodiment of the invention, said method further includes an option to embed the user's uploaded joint video recording/s onto one or more other digital platforms.

BRIEF DESCRIPTION OF THE DRAWINGS

The present invention will now be described, by way of example only, with reference to the accompanying drawings, in which.

DESCRIPTION OF PREFERRED EMBODIMENT

The following description of the invention is provided as an enabling teaching of the invention. Those skilled in the relevant art will recognize that many changes can be made to the embodiment described, while still attaining the beneficial results of the present invention. It will also be apparent that some of the desired benefits of the present invention can be attained by selecting some of the features of the present invention without utilizing other features. Accordingly, those skilled in the art will recognize that modifications and adaptations to the present invention are possible and can even be desirable in certain circumstances and are a part of the present invention. Thus, the following description is provided as illustrative of the principles of the present invention and not a limitation thereof.

Figure 1:
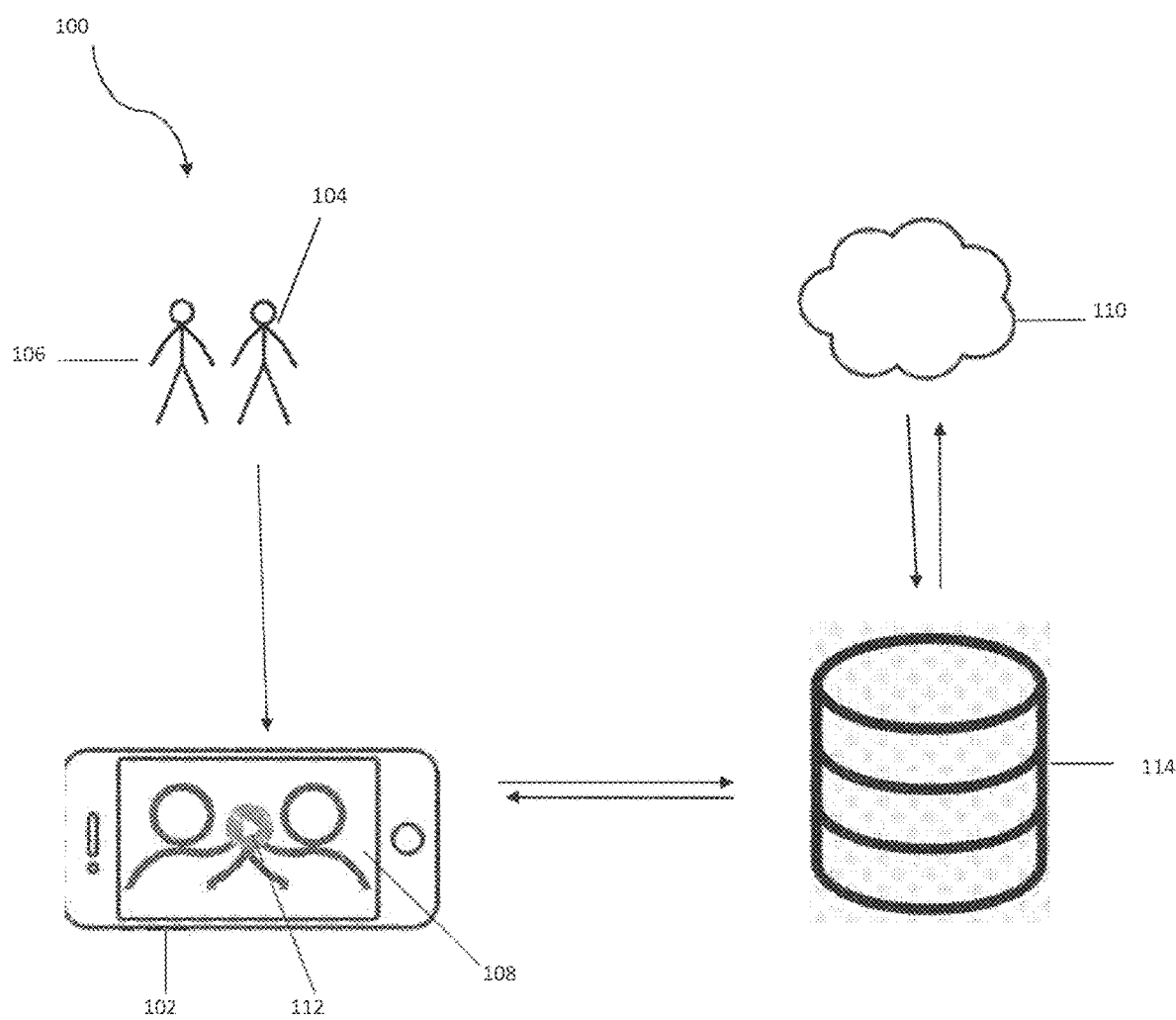
FIG. 1 is a schematic diagram of a system for endorsing individuals and/or their skills when recording a joint in person video recording in accordance with an embodiment of the invention.

In FIG. 1, a system for endorsing individuals and their skills when recording a joint "in-person" video recording, is generally described with reference to numeral 100.

The system 100 comprises a mobile device, in the example form of a mobile phone 102 which can record a video 112 of one or more persons (person A 104 and person B 106) by way of a video-selfie or otherwise when all parties are present in the same physical location. Person A (also known as the endorsor) 104 in the video-selfie recording 112 will endorse person B (also known as the endorsee) 106 for their skills/talents or services where both parties will appear in the same joint endorsement video side by side.

The video 112 will comprise a handshake (which may be in the form of a virtual handshake or physical handshake) or the like between person A 104 and person B 106 and will serve as an endorsement of one person by the other.

In addition to the above, the video 112 may be recorded as a video-selfie of person A 104 (the endorsor) endorsing person B 106 (the endorsee) wherein said endorsement video-selfie recorded 112 by person A 104 may then be uploaded and allocated to person B's profile on the system 100.

The system 100 further comprises a database 114 which includes a profile of person A 104 and/or a profile of person B 106 including the skills, experience and video endorsement/s 112 of that person 104, 106 as provided by other users or third parties.

The system 100 may further be connected to cloud-based storage solution 110 by way of a mobile communications network. In this example embodiment, the profiles of the user/s 104, 106 will be stored alongside the video endorsement/s 112 on the cloud-based storage solution 110.

The system will further comprise a mobile or web-based application 108 running on the mobile phone 102 from where the recording of the video-selfie endorsement 112 may take place or by login-in to the application via the web-based application. In this embodiment, the profile/s of the users 104, 106 may be identified and retrieved through the mobile or web-based application 108.

Figure 2:
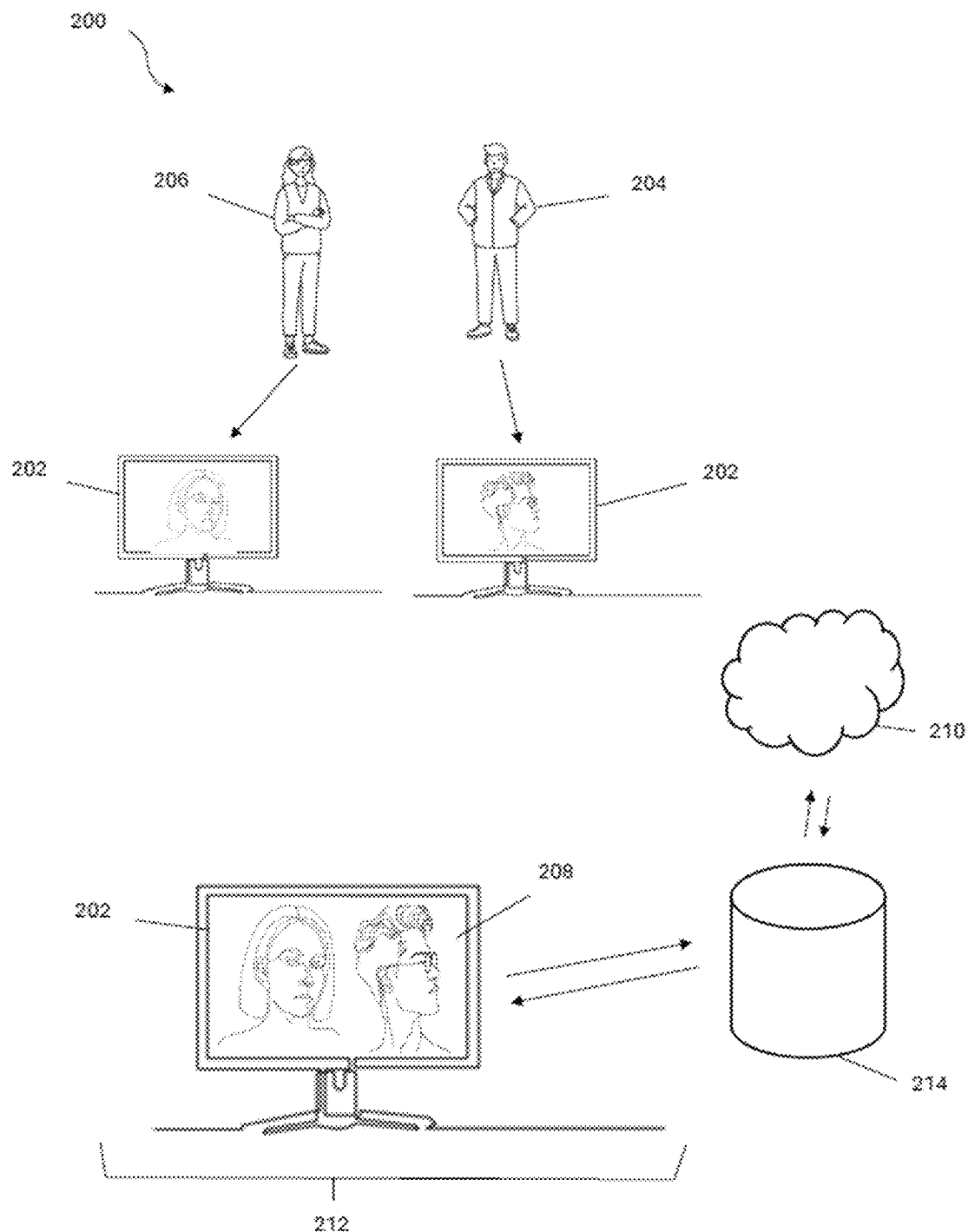
FIG. 2 is a schematic diagram of a system for endorsing individuals and/or their skills as a virtual side by side video recording when it is not possible for both or more parties to be together in the same physical location, in accordance with an embodiment of the invention.

In FIG. 2, a schematic diagram of a system for endorsing individuals and/or their skills as a virtual "side by side" video recording when it is not possible for both or more parties to be together in the same physical location is generally described with reference to numeral 200.

The system 200 comprises of a mobile phone or computer 202 which can record a video 212 of one or more persons (person A 204 and person B 206) by way of a video-selfie or otherwise when all parties are not present in the same physical location. Person A (also known as the endorsor) 204 in the video-selfie recording 212 will endorse person B (also known as the endorsee) 206 for their skills/talents or services.

The video 212 will combine the recorded videos to create a side-side handshake (which may be in the form of a virtual handshake or physical handshake) or the like between person A 204 and person B 206 and will serve as an endorsement of one person by the other displayed side by side as a joint endorsement video 212.

In addition to the above, the joint video endorsement 212 may be recorded as a video-selfie of person A 204 (the endorsor) endorsing person B 206 (the endorsee) wherein said endorsement video-selfie recorded 212 by person A 204 may then be uploaded and allocated to person B's profile on the system 200.

The system 200 further comprises a database 214 which includes a profile of person A 204 and/or a profile of person B 206 including the skills, experience and video endorsement/s 212 of that person 204, 206 as provided by other users or third parties.

The system 200 may further be connected to cloud-based storage solution 210 by way of a mobile communications network. In this example embodiment, the profiles of the user/s 204, 206 will be stored alongside the video endorsement/s 212 on the cloud-based storage solution 210.

The system will further comprise a mobile or web-based application 208 running on a mobile phone or computer 202 from where the recording of the video-selfie endorsement 212 may take place. In this embodiment, the profile/s of the users 204, 206 may be identified and retrieved through the mobile or web-based application 208.

Figure 3:
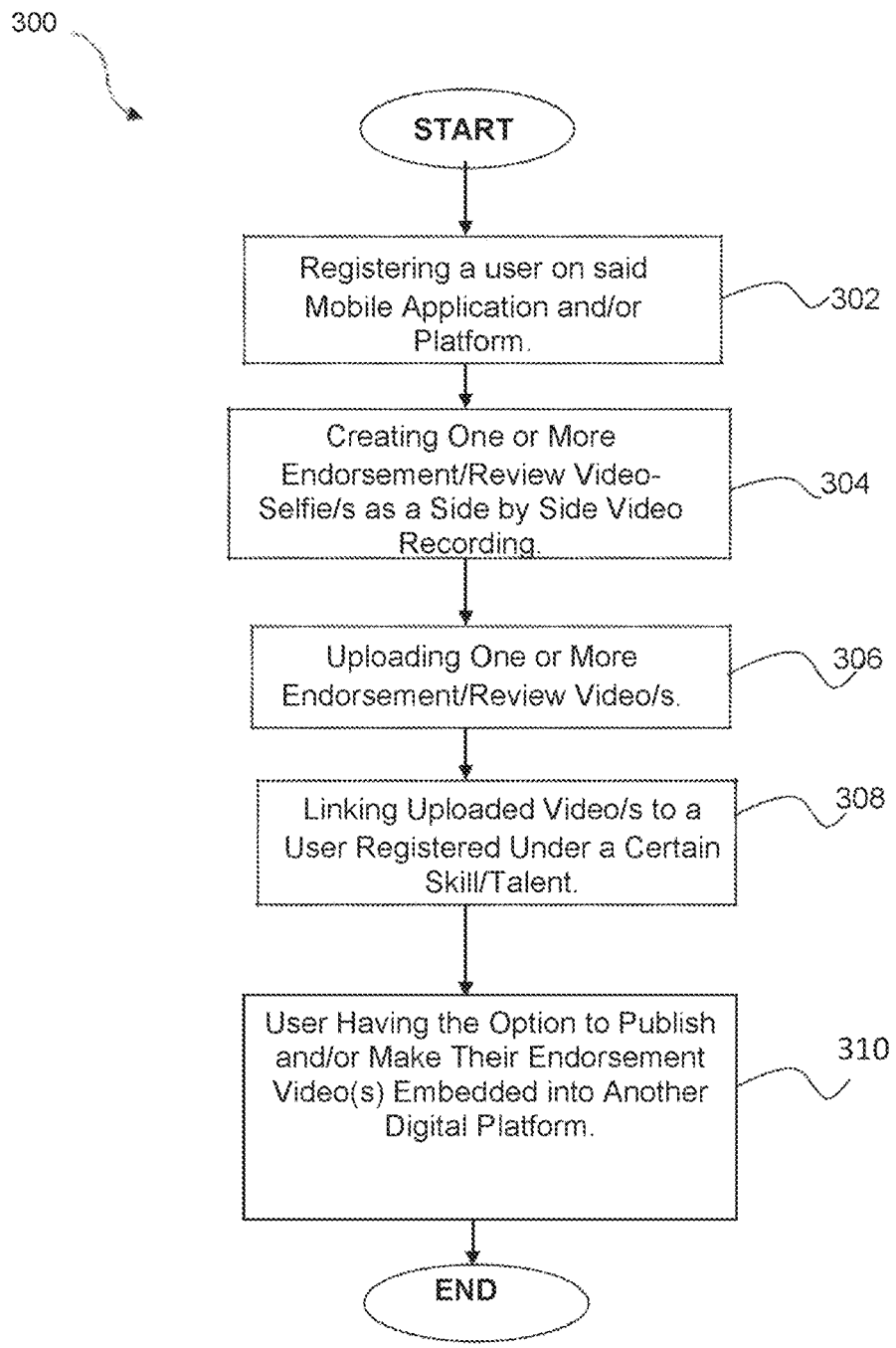
FIG. 3 is a schematic diagram of a method of endorsing individuals and/or their skills, in accordance with an embodiment of the invention.

In FIG. 3, a method for endorsing individuals and their skills, is generally described with reference to numeral 300.

At block 302, the method 300 includes the step of registering a user on the system.

At block 304, the method 300 includes the step of a user creating one or more endorsement/review video-selfie/s using a video recording device. In addition, the step 304 includes combining one or more people endorsing one another or other persons registered on the mobile application in a selfie video as a side by side video recording in either landscape or portrait mode.

At block 306, the method 300 includes the step of a user proceeding to upload one or more created endorsement videos on the system.

At block 308, the user now links uploaded endorsement videos to an endorsed user's profile which is linked to a certain skill or talent. This allows for another user to view the endorsements of a user (in the form of a a side by side video recording) linked to a certain skill or talent. Please note that an option is provided for an unregistered user to be linked to the endorsement video and to retrieve the video at a later stage.

At block 310, the user has an option to publish and/or make their endorsement video(s) embedded into any other digital platform.

Figure 4:
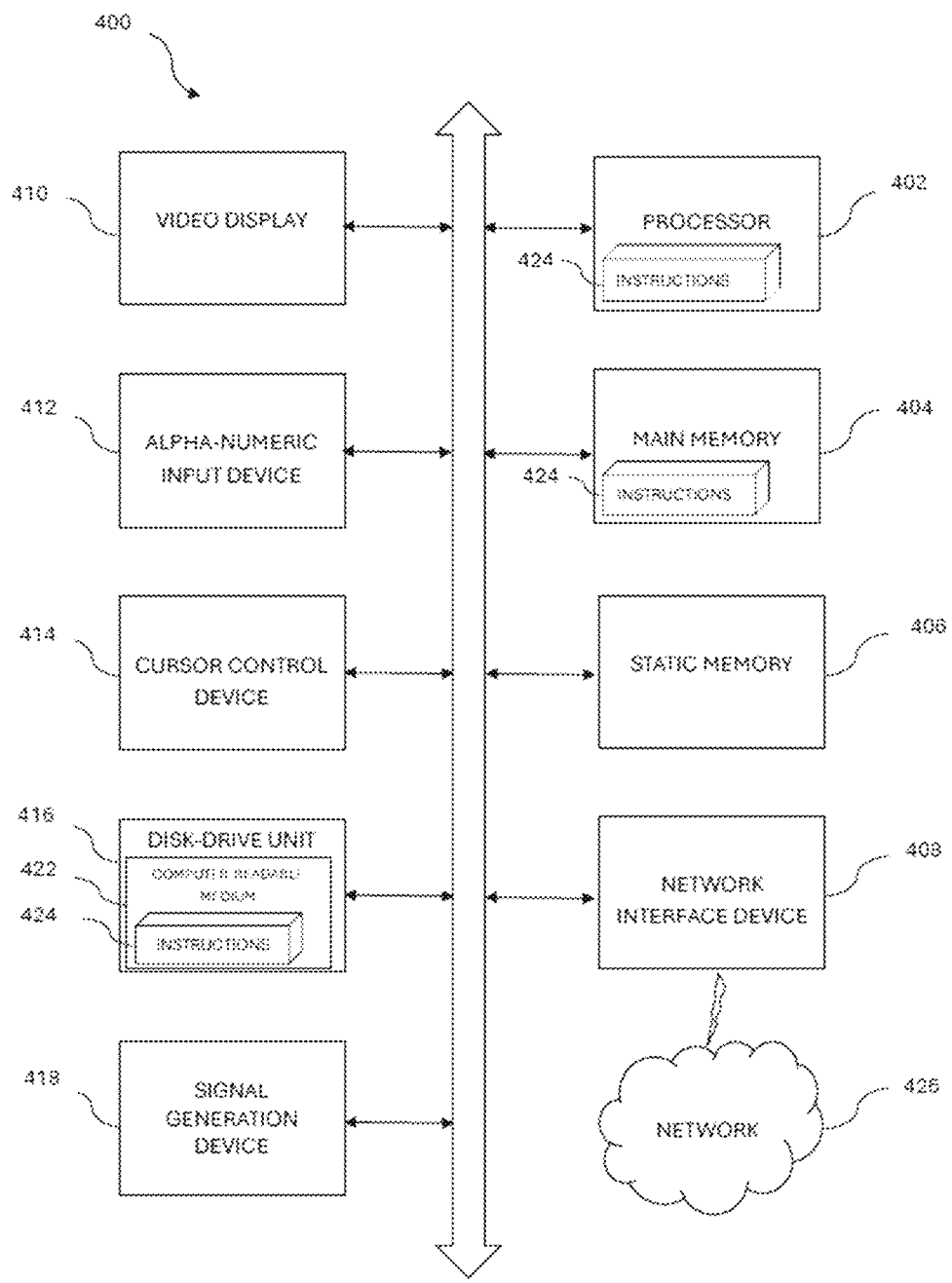
FIG. 4 is a schematic diagram of a method of endorsing individuals and/or their skills, for causing the computer to perform any one or more of the methodologies described herein, may be executed.

In FIG. 4, a computer within which a set of instructions, for causing the computer to perform any one or more of the methodologies described herein, may be executed. In accordance with embodiments of the invention, the computer is generally described with reference to numeral 400.

In a networked deployment, the computer 400 may operate in the capacity of a server or a client machine in server-client network environment, or as a peer machine in a peer-to-peer (or distributed) network environment. The computer 400 may be a personal computer (PC), a tablet PC, a set-top box (STB), a Personal Digital Assistant (PDA), a cellular telephone, a web appliance, a network router, switch or bridge, or any computer 400 capable of executing a set of instructions (sequential or otherwise) that specify actions to be taken by that computer 400. Further, while only a single computer 400 is illustrated, the term "computer" shall also be taken to include any collection of computers that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both, a main memory 404 and a static memory 406, which communicate with each other via a bus 408. The computer 400 may further include a video display unit 410 (e.g., a liquid crystal display (LCD)). The computer 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a computer-readable medium 422 on which is stored one or more sets of instructions and data structures (e.g., software 424) embodying or utilizing any one or more of the methodologies or functions described herein. The software 424 may also reside, completely or at least partially, within the main memory 404 and/or within the processor during execution thereof by the computer system 400, the main memory and the processor also constituting computer-readable media. To this end, for clarity, please note that where the software 424 is not located in the main memory 404 and/or within the processor during execution thereof by the computer system 400, it will be located in a cloud-based or remote storage location and may be executed directly from there.

The software 424 may further be transmitted or received over a network 426 via the network interface device 420 utilizing any one of several well-known transfer protocols (e.g., HTTP, FTP).

While the computer-readable medium 422 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the computer 400 and that cause the computer 400 to perform any one or more of the methodologies of the present embodiments, or that is capable of storing, encoding or carrying data structures utilized by or associated with such a set of instructions. The term "computer-readable medium" shall accordingly be taken to include, but not be limited to, solid-state memories and optical and magnetic media as well as cloud storage options (such as Amazon Webservices™, Microsoft Azure™, and the like)

Figure 5:
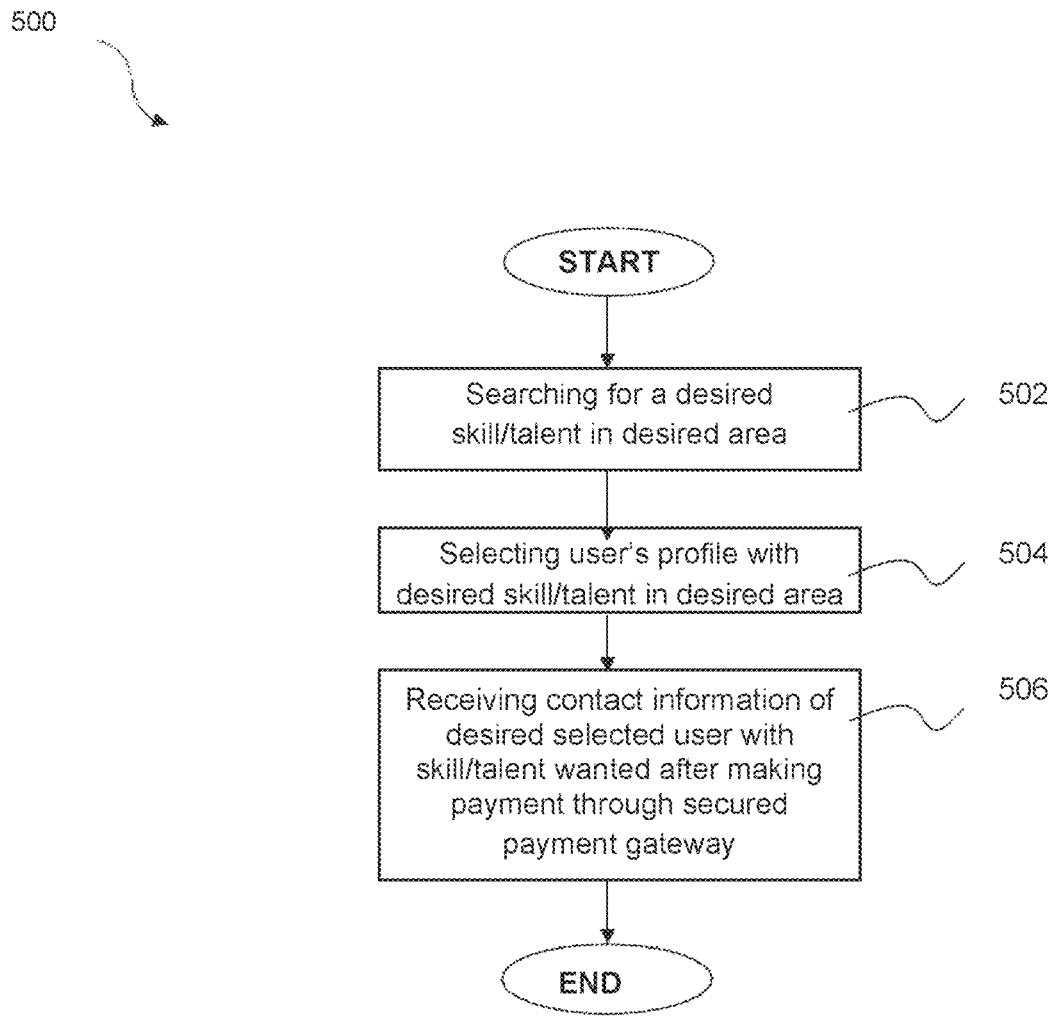
FIG. 5 is a schematic diagram of a method of endorsing individuals and/or their skills, in accordance with an embodiment of the invention.

In FIG. 5, a method for endorsing individuals and/or their skills, is generally described with reference to numeral 500.

At block 502, the method 500 includes the step of searching for a desired skill/talent in a desired geographical area.

At block 504, the method 500 includes the step of a user selecting another user's profile with the desired skill or talent, in a desired geographic area and views endorsed or reviewed a video linked to the user's profile.

At block 506, the user then selects the option to receive the contact information of the desired user, to make contact for work or business purposes and receives such contact information after making payment through the system's secured payment gateway.

The invention claimed is:

1. A first electronic device, comprising:
a communications interface;
a non-transitory computer-readable memory configured to store instructions;
at least one processor coupled to the communications interface and the non-transitory computer-readable memory and configured to execute the instructions to cause the first electronic device to:
  receive, through the communications interface, a user profile associated with a first user, wherein the user profile comprises an identity associated with the first user and a service or skill associated with the first user;
  store, to the non-transitory computer-readable memory, the user profile;
  receive, through the communications interface, endorsement content, wherein the endorsement content comprises a first video recording of the first user being together with a second user either in person or virtually recording the first video recording, wherein the first video recording comprises a virtual side-by-side handshake, and wherein receiving the endorsement content comprises:
    receiving, by the communication interface and from a second electronic device, a second video recording;
    receiving, by the communication interface and from a third electronic device, a third video recording; and
    combining the second video recording and the third video recording to create the first video recording, wherein the first video recording comprises the endorsement content, wherein the endorsement content comprises a combined second video recording and third video recording, and wherein combining the second video recording and the third video recording comprises:
      placing the second video recording on a left side of a combined video;
      placing the third video recording on a right side of the combined video; and
      creating the virtual side-by-side handshake comprising the second video recording on the left side of the combined video and the third video recording on the right side of the combined video;
  store, to the non-transitory computer-readable memory, the endorsement content, wherein the endorsement content is associated with the user profile;
  receive, through the communications interface, a search comprising an indication of the service or skill;
  select, by the at least one processor and based on the search, the user profile associated with the service or skill; and
  return, through the communications interface, the user profile and the endorsement content comprising the first video recording of the first user being together with the second user by returning the endorsement content comprising the combined second video recording and third video recording;
a blockchain verification system coupled to the at least one processor and configured to:
  track third users based on skills;
  track fourth users based on an ability to deliver a service; and
  track fifth users based on an ability to perform a specific job, wherein the first user is one of the third users, the fourth users, or the fifth users; and
a secure payment gateway coupled to the at least one processor and configured to receive, before returning the user profile and the endorsement content, a payment for the user profile and the endorsement content, wherein the payment comprises a prepaid card payment, a debit card payment, a credit card payment, or a cryptocurrency payment, and
wherein the at least one processor is further configured to execute the instructions to cause the first electronic device to return the user profile and the endorsement content by returning, after successfully receiving the payment, the user profile and the endorsement content.

2. The first electronic device of claim 1, wherein the search is received from a mobile device application or a mobile platform.

3. The first electronic device of claim 1, wherein the endorsement content is received from one or more mobile applications or platforms on a mobile device.

4. The first electronic device of claim 3, wherein the user profile is received from the one or more mobile applications or platforms on the mobile device.

5. The first electronic device of claim 1, wherein the non-transitory computer-readable memory comprises one or more databases configured to securely store and protect a user's personal information, uploaded photographs, and uploaded videos.

6. The first electronic device of claim 1, wherein the endorsement content is visible on the user profile.

7. The first electronic device of claim 6, wherein the at least one processor is further configured to execute the instructions to cause the electronic device to receive, through the communications interface, an instruction to remove or hide the endorsement content from the user profile.

8. The first electronic device of claim 1, wherein the at least one processor is further configured to execute the instructions to cause the first electronic device to:
  receive Global Positioning System (GPS) information comprising a geographical position of the first user; and
  link the user profile of the first user to the geographical position, and
wherein the at least one processor is further configured to execute the instructions to cause the first electronic device to return the user profile and the endorsement content by returning, based on the geographical position of the first user, the user profile and the endorsement content.

9. A method implemented by a first electronic device, the method comprising:
- receiving, through a communications interface of the first electronic device, a user profile associated with a first user, wherein the user profile comprises an identity associated with the first user and a service or skill associated with the first user;
- storing, to a non-transitory computer-readable memory of the first electronic device, the user profile;
- receiving, through the communications interface of the first electronic device, endorsement content, wherein the endorsement content comprises a first video recording of the first user being together with a second user either in person or virtually recording the first video recording, wherein the first video recording comprises a virtual side-by-side handshake, and wherein receiving the endorsement content comprises:
  - receiving, by the communication interface and from a second electronic device, a second video recording;
  - receiving, by the communication interface and from a third electronic device, a third video recording; and
  - combining the second video recording and the third video recording to create the first video recording, wherein the first video recording comprises the endorsement content, wherein the endorsement content comprises a combined second video recording and third video recording, and wherein combining the second video recording and the third video recording comprises:
    - placing the second video recording on a left side of a combined video;
    - placing the third video recording on a right side of the combined video; and
    - creating the virtual side-by-side handshake comprising the second video recording on the left side of the combined video and the third video recording on the right side of the combined video;
- storing, to the non-transitory computer-readable memory of the first electronic device, the endorsement content, wherein the endorsement content is associated with the user profile;
- receiving, through the communications interface of the first electronic device, a search comprising an indication of the service or skill;
- selecting, by at least one processor of the first electronic device and based on the search, the user profile associated with the service or skill; and
- returning, through the communications interface of the first electronic device, the user profile and the endorsement content comprising the first video recording of the first user being together with the second user by returning the endorsement content comprising the combined second video recording and third video recording;
- tracking, by a blockchain verification system coupled to the at least one processor, third user based on skills;
- tracking, by the blockchain verification system, fourth users based on an ability to deliver a service;
- tracking, by the blockchain verification system, fifth users based on an ability to perform a specific job, wherein the first user is one of the third users, the fourth users, or the fifth users;
- receiving, by a secure payment gateway coupled to the at least one processor and before returning the user profile and the endorsement content, a payment for the user profile and the endorsement content, wherein the payment comprises a prepaid card payment, a debit card payment, a credit card payment, or a cryptocurrency payment; and
- returning, by the at least one processor and after successfully receiving the payment, the user profile and the endorsement content.

10. The method of claim 9, further comprising associating a digital identification link of a non-registered user with the endorsement content.

11. The method of claim 10, further comprising using the digital identification link to track or access the endorsement content.

12. The method of claim 9, further comprising:
- returning, through the communications interface of the first electronic device, personal information of the first user; and
- receiving, from a mobile application or platform, a payment for the personal information of the user.

13. A system, comprising:
- a server comprising:
  - a non-transitory computer-readable memory configured to store instructions; and
  - at least one processor coupled to the non-transitory computer-readable memory and configured to execute the instructions to cause the server to:
    - receive a user profile associated with a first user, wherein the user profile comprises an identity associated with the first user and a service or skill associated with the first user;
    - store the user profile;
    - receive endorsement content, wherein the endorsement content comprises a first video recording of the first user being together with a second user either in person or virtually recording the first video recording, wherein the first video recording comprises a virtual side-by-side handshake, and wherein receiving the endorsement content comprises:
      - receiving, from a second electronic device, a second video recording;
      - receiving, from a third electronic device, a third video recording; and
      - combining the second video recording and the third video recording to create the first video recording, wherein the first video recording comprises the endorsement content, wherein the endorsement content comprises a combined second video recording and third video recording, and wherein combining the second video recording and the third video recording comprises:
        - placing the second video recording on a left side of a combined video;
        - placing the third video recording on a right side of the combined video; and
        - creating the virtual side-by-side handshake comprising the second video recording on the left side of the combined video and the third video recording on the right side of the combined video;
    - store the endorsement content, wherein the endorsement content is associated with the user profile;
    - receive a search comprising an indication of the service or skill;
    - select, based on the search, the user profile associated with the service or skill; and return the user profile and the endorsement content comprising the first video recording of the first user being together with the second user by returning the endorsement content comprising the combined second video recording and third video recording;

a blockchain verification system coupled to the server and configured to:

track third users based on skills;

track fourth users based on an ability to deliver a service; and track fifth users based on an ability to perform a specific job, wherein the first user is one of the third users, the fourth users, or the fifth users; and a secure payment gateway coupled to the server and configured to receive, before returning the user profile and the endorsement content, a payment for the user profile and the endorsement content, wherein the payment comprises a prepaid card payment, a debit card payment, a credit card payment, or a cryptocurrency payment, and wherein the at least one processor is further configured to execute the instructions to cause the server to return the user profile and the endorsement content by returning, after successfully receiving the payment, the user profile and the endorsement content.

\* \* \* \* \*